(12) United States Patent
Honguh et al.

(10) Patent No.: US 6,264,332 B1
(45) Date of Patent: Jul. 24, 2001

(54) ILLUMINATION APPARATUS AND A PROJECTION TYPE IMAGE DISPLAY APPARATUS USING IT

(75) Inventors: Yoshinori Honguh; Yuzuru Takashima, both of Kanagawa-ken; Hisayuki Mihara, Saitama-ken; Masaru Kitamura, Tokyo, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/272,361

(22) Filed: Mar. 19, 1999

(30) Foreign Application Priority Data

Mar. 20, 1998 (JP) ................................. 10-072636

(51) Int. Cl.$^7$ ................................ G03B 21/14
(52) U.S. Cl. ............................ 353/38; 353/102
(58) Field of Search ................ 353/38, 98, 102, 353/81, 122

(56) References Cited

U.S. PATENT DOCUMENTS

| | | | |
|---|---|---|---|
| 4,770,525 | * 9/1988 | Umeda et al. | 353/122 |
| 5,098,184 | * 3/1992 | Van Den Brandt et al. | 353/102 |
| 5,833,341 | * 11/1998 | Kimura et al. | 353/98 |
| 5,973,841 | * 10/1999 | Watanabe | 359/618 |

FOREIGN PATENT DOCUMENTS 10-186301  7/1998 (JP).

* cited by examiner

Primary Examiner—William Dowling
(74) Attorney, Agent, or Firm—Foley & Lardner

(57) ABSTRACT

A projection type image display apparatus for projecting an image onto a screen includes a light source, a beam shape converter, a beam divider, a beam superimposer, a processing unit, and a projection lens. In operation, the light source emits a light beam. The beam shape converter converts a sectional shape of the light beam into a different shape. For example, the beam shape converter can convert a circular cross section into a rectangular cross section. The beam divider then spatially divides the converted light beam into plural light beams. The beam divider can include, for example, a first prism array that divides the converted light beam horizontally and vertically into four beams. The beam superimposer superimposes the plural light beams onto a target surface, such as a liquid crystal panel. The beam superimposer can include, for example, a second prism array and a beam collimator that superimpose the plural light beams on the target surface. The processing unit supplies a signal so as to display an image on the target surface. The projection lens projects the image onto the screen by the superimposed beam. This apparatus can improve the uniformity of illuminance distribution and the light utilization efficiency, while maintaining high directivity of light.

5 Claims, 12 Drawing Sheets

ILLUMINATION APPARATUS AND A PROJECTION TYPE IMAGE DISPLAY APPARATUS USING IT

BACKGROUND

1. Field of the Invention

The present invention relates to an illumination apparatus and a projection type image display apparatus using it.

2. Description of the Related Art

In recent years, liquid crystal projectors have become popular for many uses because they fulfill user's desires for a large area display in applications such as a personal computer or a television, and improvements in the technology relating to liquid crystals have made it easier to manufacture a large area display.

Although the liquid crystal projector and a CRT (Cathode-Ray Tube) projector have similar functions, the former provides better image quality and is smaller and lighter than the latter. However, conventional liquid crystal projectors do not provide a sufficiently bright screen, and an improvement in brightness is now desired in many applications. It is common to use a combination of a high-luminance lamp and a paraboloidal or a ellipsoidal reflector as a light source to improve brightness. However, the generated light beam is poor in illuminance uniformity. Therefore it is necessary to improve the uniformity of the screen luminance.

SUMMARY OF THE INVENTION

The present invention has been made in view of the above-mentioned circumstances and is intended to solve the above-mentioned problems. In particular, a purpose of the present invention is to provide an illumination apparatus which can maintain higher uniformity in illuminance distribution even in a case where part of an optical system has nonuniform characteristics, for instance, a light source has a nonuniform emission distribution. This invention also provides a projection type image display apparatus which has higher uniformity in luminance distribution by employing the illumination apparatus. Additional purposes and advantages of the invention may be apparent from the following description or may be learned by practice of the invention.

The present invention provides an illumination apparatus for illuminating a light beam onto a target surface, including a beam shape converter that converts a sectional shape of the light beam into a different shape, a beam divider that spatially divides the converted light beam into plural light beams, and a beam superimposer that superimposes the plural light beams onto the target surface.

In accordance with one aspect of the present invention, a projection type image display apparatus for projecting an image onto a screen, includes a light source that emits a light beam, a beam shape converter that converts a sectional shape of the light beam into a different shape, a beam divider that spatially divides the converted light beam into plural light beams, a beam superimposer that superimposes the plural light beams onto a target surface, a processing unit that supplies a signal so as to display an image on the target surface, and a projection lens that projects the image onto the screen by the superimposed beam.

According to a preferred embodiment of the present invention, the beam shape converter may convert a sectional shape of the light beam from an approximately circular shape to an approximately rectangular shape. The converted light beam may have the rectangular sectional shape at a position where the beam divider is located. The beam divider may include an optical element having a plurality of optical surfaces, and the converted light beam passes through the optical element so that the light beam is spatially divided into the plural light beams.

In the illumination apparatus, a light intensity distribution on the target surface may have higher uniformity than that on the beam shape converter. The beam shape converter may convert the sectional beam shape in such a manner that boundaries of the optical surfaces of the optical element are more illuminated than the center area of the optical surfaces of the optical element.

The present invention may also include an imaging element for allowing both positions of the beam superimposer and the target surface to have a conjugate relationship with each other. The superimposer may further include a beam deflector that deflects the plural light beams, and a beam collimator that converts the deflected plural light beams into parallel light beams, so as to superimpose the divided beams on the target surface.

Furthermore, the present invention also provides a method of illuminating a light beam onto a target surface, including steps of converting a sectional shape of the light beam into a different shape, spatially dividing the converted light beam into plural light beams, and superimposing the plural light beams onto the target surface.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Embodiments of an illumination apparatus and a projection type image display apparatus of the present invention will now be specifically described in more detail with reference to the accompanying drawings. Wherever possible, the same reference numbers will be used throughout the drawings to refer to the same or like parts.
(Embodiment 1)

Figure 1:
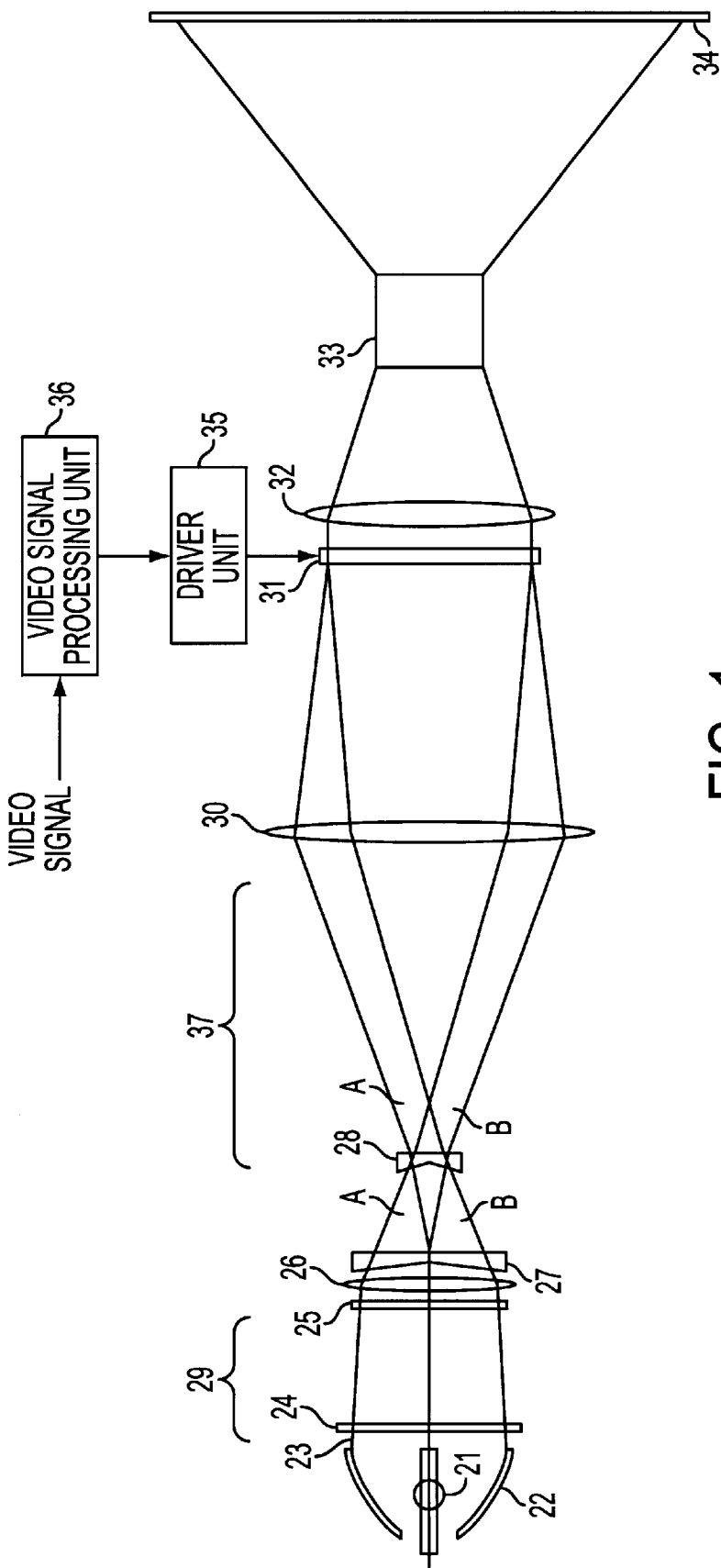
FIG. 1 is a schematic illustration of a liquid crystal projector, which is a kind of a projection type image display apparatus, having an illumination apparatus according to a first embodiment of the present invention.

FIG. 1 shows the configuration of a liquid crystal projector according to a first embodiment of the present invention. The liquid crystal projector is a kind of a projection type image display apparatus, and in this figure only focuses on the configuration of an illumination apparatus of the liquid crystal projector.

In FIG. 1, light that is emitted from a light source (a lamp 21) is converted into a parallel, convergent, or divergent light beam 23 by a reflector 22. The light beam then enters a beam shape converter 29 that converts a sectional shape of the beam into a different shape. The beam shape converter 29 shown in FIG. 1 includes, for example, a first element 24 and a second element 25. The light beam 23 passes through the first element 24 and has an approximately rectangular sectional shape at the position of the second element 25. The second element 25 has a function of converting an incident light beam into a parallel beam. Each of the first element 24 and the second element 25 is formed as a special optical element having curved surfaces that are determined by an optimizing calculation.

The light beam that has passed through the second element 25 then passes through a lens 26 that constitutes a relay lens system and is converted into a convergent light beam. The light beam then passes through a first prism array 27, which is an example of a beam divider that spatially divides the converted light beam into plural light beams. For example, the light beam is spatially divided vertically and horizontally into four parts.

FIG. 1 shows two beams A and B of the four divisional beams. Since the four divisional beams are deflected individually by the first prism array 27, they converge at four different points that deviate from an optical axis.

The divisional beams then enter a beam superimposer 37 that superimposes the plural light beams onto a target surface, such as a liquid crystal panel 31. The beam superimposer 37 shown in FIG. 1 includes, for example, a beam deflector, such as a second prism array 28, and a relay lens 30, such as a beam collimator. The light beam, which has already been deflected by the first prism array 27 so as to converge at the four converging points, is deflected again by the second prism array 28, which is disposed at a position close to those converging points. The deflection directions are determined such that the beams are correctly guided to a region to be illuminated of the liquid crystal panel 31 via the relay lens 30. The light beams that have passed through the second prism array 28 enter the relay lens 30 as divergent beams and are converted into parallel beams, which are guided to the liquid crystal panel 31. As described above, each of the four divisional light beams is guided to the liquid crystal panel 31 correctly, and the four beams are superimposed one on another on the liquid crystal panel 31.

The light beam passed through the liquid crystal panel 31 is focused by a field lens 32 into the aperture of a projection lens 33, and then the image displayed on the liquid crystal panel 31 is projected onto a screen 34. The field lens 32 is not essential in this embodiment. Instead of using the field lens 32, a convergent beam may be input to the liquid crystal panel 31. If the liquid crystal panel 31 and the projection lens 33 are approximately equal to each other in size, an image displayed on the liquid crystal panel 31 that is illuminated with the parallel beams may be directly projected onto the projection lens 33.

A video signal that is input from an external device is processed by a video signal processing unit 36 and then supplied, as a drive signal, to a driver unit 35 for driving the liquid crystal panel 31. As a result, an image that reflects the video signal is displayed on the liquid crystal panel 31.

A cooling device such as a cooling fan for cooling the light source can be incorporated in the apparatus if necessary. Further, any of various optical parts such as a protective part for preventing fragments of the lamp 21 from scattering if it explodes, a filter for eliminating ultraviolet light or infrared light through reflection or absorption, an optical system for properly aligning polarization directions, and a reflector or a prism for changing a direction of the optical path can be inserted in the optical path, if necessary.

Figure 2:
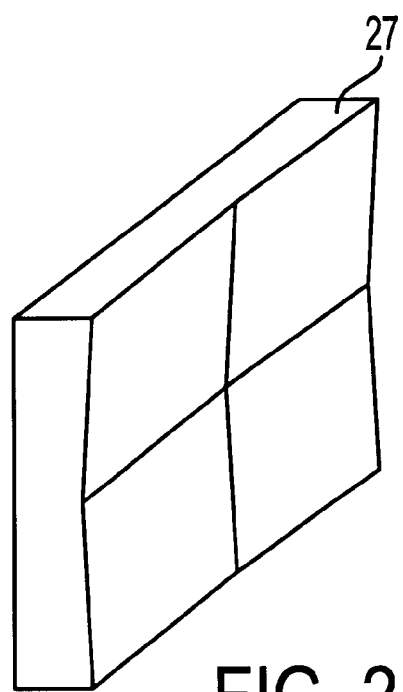
FIG. 2 shows an example of a first prism array provided in the illumination apparatus of FIG. 1.

FIG. 2 shows an example of the first prism array 27. A light passage area of the first prism array 27 is divided into four regions that have respective prism surfaces, and these surfaces each face in a different direction. Therefore, the first prism array 27 divides a light beam into four beams. The individual prism surfaces are so shaped and oriented as to converge the divisional beams on different positions. Although the optical system of FIG. 1 employs the prism array 27 having four divisional prism surfaces forming an incident surface, a prism array having four divisional prism surfaces forming an exit surface, facing the relay lens 30, may be used. Also in this case, the individual prism surfaces are optimized so as to have shapes and orientations that cause the divisional beams to converge on different positions.

Figure 3:
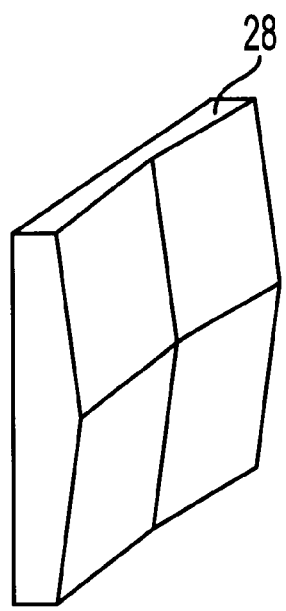
FIG. 3 shows an example of a second prism array provided in the illumination apparatus of FIG. 1.

FIG. 3 shows an example of the second prism array 28. The second prism array 28, which guides four divisional beams to the lens 30 by deflecting those beams as described above, has four divisional prism surfaces. The orientations of the respective surfaces of the first prism array 27 are determined so that the light beams converge in the vicinity of the centers of the four respective divisional regions of the second prism array 28. The converged divisional beams are deflected upon passing through the respective prism surfaces of the second prism array 28. FIG. 1 shows a case where the divisional light beam A is deflected upward and the divisional light beam B is deflected downward, respectively. The individual prism surfaces of the second prism array 28 are optimized to have shapes and orientations that cause the four divisional beams to become superimposed one on another with high accuracy on the liquid crystal panel 31 after passing through the lens 30.

By converging four divisional light beams on the different prism surfaces of the second prism array 28 in the above manner, the second prism array 28 can be made smaller than the first prism array 27. Therefore, the divisional beams can easily be superimposed one on another with a smaller optical system than a configuration in which divisional beams are diverged. Miniaturizing the second prism array 28 makes it possible to prevent transmission of unnecessary beams having different angles than the divisional beams.

Although the optical system of FIG. 1 employs the prism array 28 having four divisional prism surfaces forming an incident surface, a prism array having four divisional prism surfaces forming an exit surface, facing the relay lens 30, may be used. Also in this case, the individual prism surfaces are determined such that divisional beams are superimposed one on another with high accuracy on the liquid crystal panel 31.

The first element 24, which is a part of the beam shape converter 29, increases the uniformity in illuminance distribution by a circular-to-rectangular transformation which transforms an approximately axially symmetric circular light beam into a light beam that has an approximately rectangular sectional shape. As for the design method of the first element 24, since thick lenses are used to shorten the length of the optical path, an optimization may be done by taking account of a curved shape of these lenses.

It is desirable for one surface of the first element 24 to be a spherical surface and the other surface to be a free surface, if the first element 24 is manufactured by injection molding. It is preferable to make the incident surface a concave surface and the exit surface an optimum free surface, respectively. These surfaces are designed by using an optimization design program based on a combination of the nonlinear least squares method and a ray tracing method. This is a method in which several sample rays are set and values of unknown parameters that define surfaces are determined so that the sample rays reach points that are as dose as possible to target points that are arranged in rectangular form, and is basically the same as a general procedure. This general procedure is disclosed in the Japanese Patent Application No. 06-238122 and is adaptable to this embodiment.

Here, in a thin-lens approximation in which a polynomial phase transfer function is used to design the first element 24, calculations can be performed very easily because a Jacobian can be analytically expressed. However, in a thick-lens design method in which a curved surface is expressed by a polynomial, the Jacobian cannot be expressed analytically, in general. Therefore, this embodiment employs a method of replacing partial differentials with differences and using the differences for the Jacobian. As a result, although computer resources necessary for the processing increase considerably, an important advantage that the optical path can be shortened is obtained.

The shape of the first element 24 is determined such that a rectangular beam has higher intensity in the vicinity of dividing imaginary lines that divide the surface of the first prism array 27 into four regions than in the inner portion of those divisional prism regions.

That is, in the illumination apparatus shown in FIG. 1 that uses the optical system in which a light beam that has been uniformalized by the light beam shape converter 29 is divided and resulting divisional light beams are superimposed one on another, individual divisional light beams that have passed through the respective divisional prism surface of the first prism array 27 are applied to almost the entire surface of the liquid crystal panel 31. Thus, light beams that have passed through portions of the first prism array 27 in the vicinity of its dividing boundary lines are transmitted to peripheral regions of the screen. Therefore, by increasing the illuminance in the vicinity of the dividing boundary lines, illuminance reduction in the screen peripheral regions can be prevented and therefore the quality of a projected image can be improved.

Two major advantages result from dividing a light beam and superimposing resulting divisional beams one on another. The first advantage is that a center area of the liquid crystal panel 31 does not become a singular point. Usually the light intensity on the second element 25 tends to be low at a centermost area and high at an area adjacent the centermost area, and tends to decrease from the adjacent area toward a surrounding area. In conventional devices, the low intensity at the centermost area becomes a dark area on the liquid crystal panel 31. In this invention, however, the light from the surrounding area is guided to the centermost area and compensates for the low light intensity of the centermost area.

By dividing a light beam into four beams and superimposing those one on another, the light near the centermost area is distributed to the corners of the display area. Thus, possibility of occurrence of an error in the fixing position of the light source or the fixing positions of the optical elements, and possibility of occurrence of brightness or darkness of a center area in comparison with the surrounding area depending on the fixing position decreases. Therefore, the displayed image shows better performance.

The second advantage is that the present invention reduces nonuniformity in emission distribution on the target surface that is caused by nonuniformity in the emission distribution of the light source. An arc region that is generated around a light-emitting portion of a high-luminance discharge lamp (a metal halide lamp, a mercury lamp, or the like) does not always emit light uniformly due to influences of gravity and variations in discharge conditions of the lamp. Since the circular-to-rectangular transformation by the elements 24 and 25 maintains the directivity of the light beam, the nonuniformity in emission distribution of the light directly affects nonuniformity in luminance distribution. The same thing applies to nonuniformity in color etc.

In this embodiment, a light beam for which distribution has been uniformized by the light beam shape conversion is further subjected to division and superimposition. Since this reduces the nonuniformity in emission distribution, the uniformity of the illuminance distribution can be improved. Therefore, when the illumination apparatus of this embodiment is used in a projection type image display apparatus such as a liquid crystal projector, a projected image can be free of nonuniformity in luminance distribution.

It is expected that an illuminance distribution will become more uniform by increasing the division number. It was determined by experimental evaluation that a practical level of uniformity can be obtained by division into four parts. However, there is no reason to limit the division number to four; the number may be a suitable number depending on such conditions as the specifications of the light source and required levels of directivity and uniformity.

It is noted that a desired level of uniformity can be obtained more easily when singular points exist in the vicinity of boundary lines or near corner portions than when they are exist near the center area of respective divisional regions. The division into four regions provides symmetry with respect to the vertical and horizontal center lines. Therefore, if one of four divisional parts of the optical system is designed, symmetrical designs can be employed for the other three parts. The division into four regions is thus advantageous in terms of design, manufacture, etc.

As described above, the first embodiment makes it possible, with a relatively small and simple configuration, to prevent nonuniformity in illuminance distribution that occurs after beam shape conversion by beam division and superimposition while maintaining directivity as a feature of the beam shape conversion.

(Embodiment 2)

Figure 4:
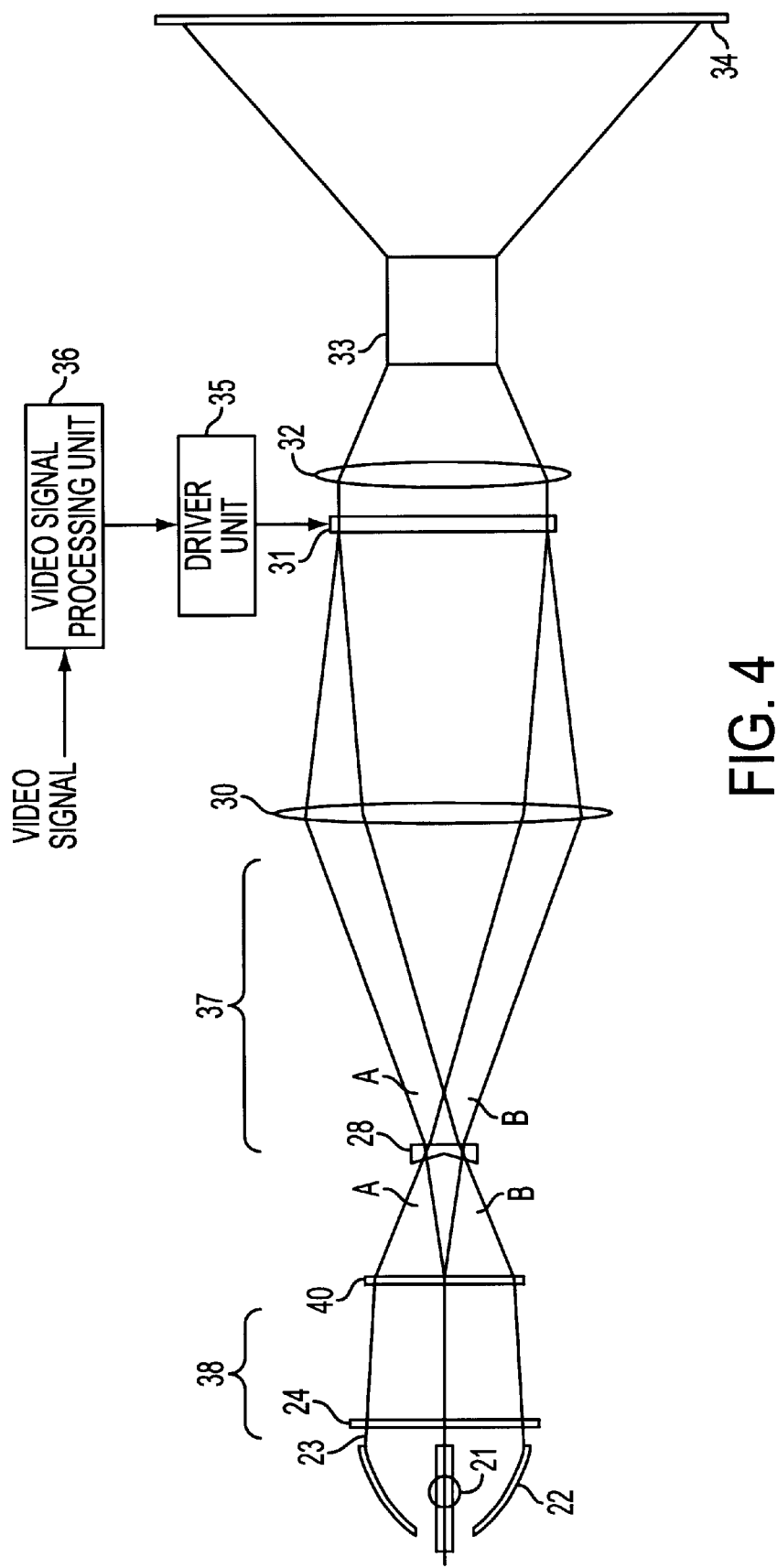
FIG. 4 is a schematic illustration of the liquid crystal projector having an illumination apparatus according to a second embodiment of the invention.

FIG. 4 shows the configuration of an illumination apparatus of a liquid crystal projector according to a second embodiment of the present invention. The elements in FIG. 4 that are common to FIG. 1 are given the same reference numbers as in FIG. 1. Descriptions for the elements in FIG. 4 having common operation to the corresponding elements in FIG. 1 will be omitted.

This embodiment, as shown in FIG. 4, has a beam shape converter 38 that preferably includes the first element 24 and a composite function element 40. The composite function element 40 performs the functions of three elements in the first embodiment, namely the second element 25, the lens 26 and the first prism array 27, and is disposed at nearly the same position as those three elements in FIG. 1. Thus, an improvement is made that the number of elements is reduced.

Since the composite function element 40 performs the functions of different elements, it is a part of the beam shape converter 38 as well as a beam divider of the present invention.

The composite function element 40 is a special optical element having properly curved surfaces that are determined by an optimizing calculation. In this embodiment, in determining curved surface shapes, parameters are determined by performing an optimizing calculation in such a manner that areas close to the centers of the respective divisional surfaces of the second prism array 28 are directly used as target points, which design step corresponds to the step of the first embodiment in which the second element 25 is so designed as to produce a parallel output beam.

This embodiment also improves performance of the apparatus. In the first embodiment, the lens 26 and the first prism array 27 are located in the optical path and, thus, aberrations occurs. Because of the design method in which converging points are directly employed as target points, this embodiment can improve the performance by avoiding effects of such aberrations.

This embodiment employs the element 40 having all the functions of all the three elements 25, 26 and 27 of the first embodiment. However, naturally there maybe employed, for instance, an element having the functions of only two of the three elements and another element. This configuration increases the flexibility in designing the optical system. Depending on the use and the dimensions of the apparatus, there may be a case in which such a configuration is easier to implement.

In determining the design parameters of curved surfaces through optimization, it is necessary to define function forms that represent element shapes and set sample rays and target points. To attain higher accuracy, it is preferable to employ more flexible function forms including more parameters. It is possible to determine the target points by using the mapping method for the positions of the sample rays.

As it is designed by optimization, it is not assured that a derived solution is always satisfactory. Therefore, it is necessary to use a simulation to predict the performance that will be realized by determined parameters. It is possible to execute, if necessary, a step of adjusting a design by calculating an expected luminance distribution by a Monte Carlo method taking consideration into the arc size of the light source.

(Embodiment 3)

Figure 5:
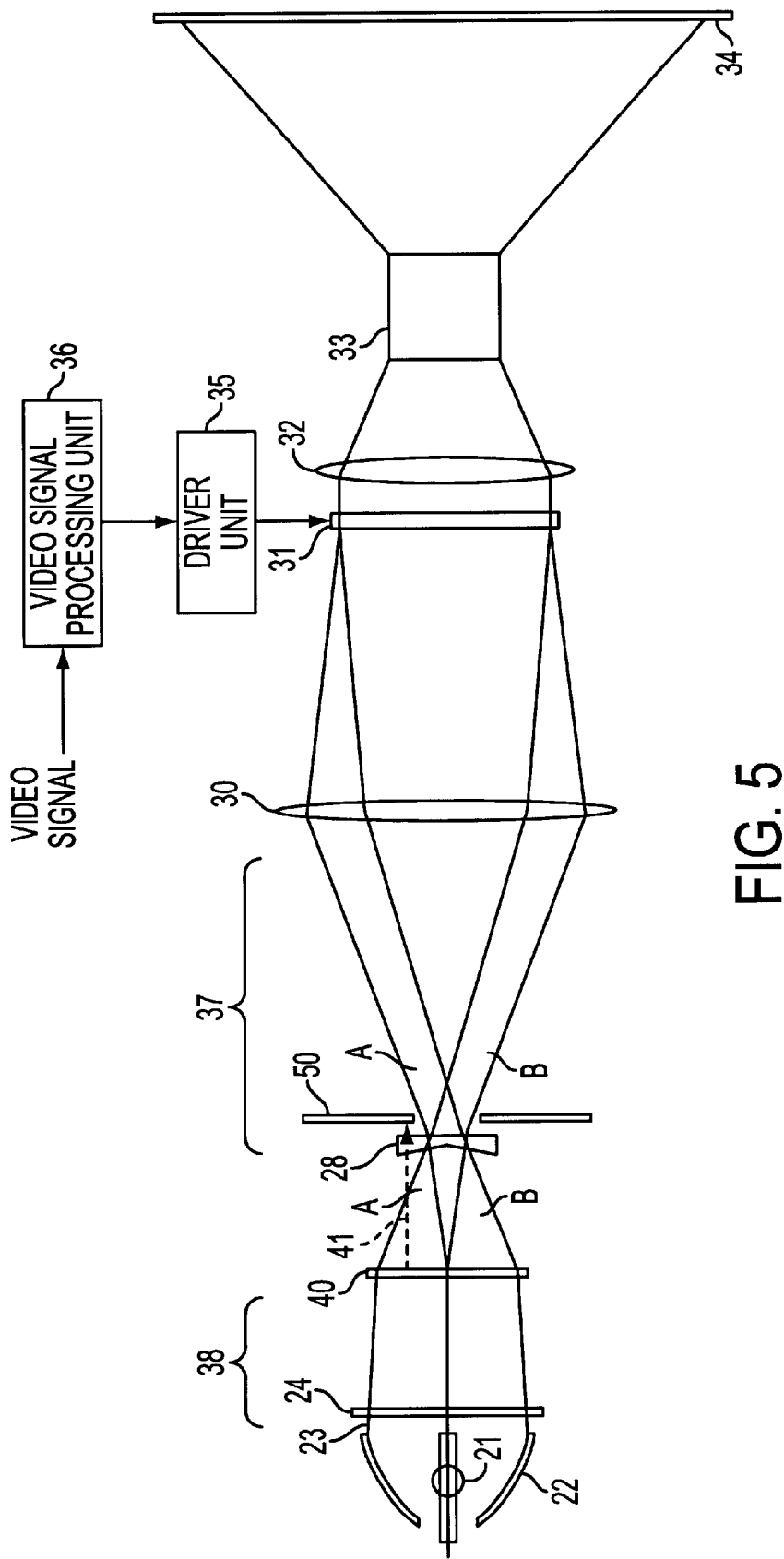
FIG. 5 is a schematic illustration of the liquid crystal projector having an illumination apparatus according to a third embodiment of the invention.

FIG. 5 shows the configuration of an illumination apparatus of a liquid crystal projector according to a third embodiment of the present invention. The elements in FIG. 5 that are common to FIG. 4 are given the same reference numbers as in FIG. 4. Descriptions for the elements in FIG. 5 having common operation to the corresponding elements in FIG. 4 will be omitted.

In this embodiment, the second prism array 28 is designed to be larger than those in FIGS. 1 and 4 so that its shape can be manufactured with higher accuracy. A light shield plate 50 having a predetermined opening is additionally provided on the exit-surface side of the second prism array 28. The light shield plate 50 blocks extra light components 41 that are incident on the second prism array 28 at different angles than divisional beams. Passage of the extra light components 41 could be a cause of nonuniformity in the illuminance distribution. Preventing the passage of the extra light components 41 with the light shield plate 50 increases the flexibility in designing the dimensions of the second prism array 28. The light shield plate 50 may be provided on the incident-surface side of the second prism array 28. Instead of the light shield plate 50, a light shield film having a predetermined opening hole and including a reflective material on its inside surface may be bonded to, for instance, the exit surface of the second prism array 28.

(Embodiment 4)

Figure 6:
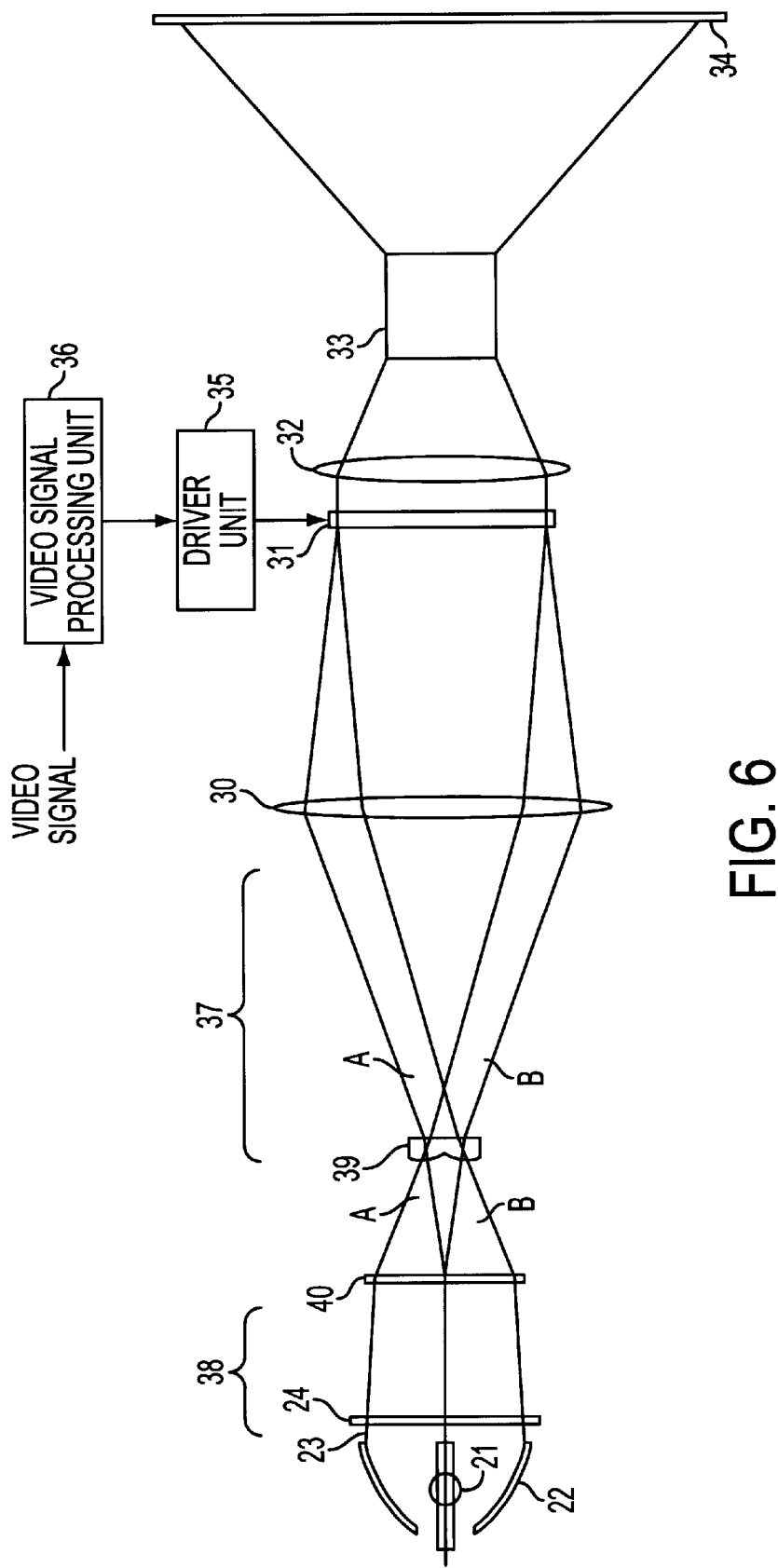
FIG. 6 is a schematic illustration of the liquid crystal projector having an illumination apparatus according to a fourth embodiment of the invention.

FIG. 6 shows the configuration of an illumination apparatus of a liquid crystal projector according to a fourth embodiment of the invention. The elements in FIG. 6 that are common to FIG. 4 are given the same reference numbers as in FIG. 4. Descriptions for the parts in FIG. 6 having common operation to the corresponding parts in FIG. 4 will be omitted.

In this embodiment, the exit surface of the second prism array 39 has four divisional prism surfaces and its incident surface has four convex surfaces having a certain radius of curvature. The four convex surfaces are formed by dividing the incident surface of the second prism array 39 vertically and horizontally so as to correspond to four divisional beams, that is, the four divisional prism surfaces. The shape of each convex surface is determined such that the position of the composite function element 40 where an approximately rectangular light beam is obtained and the position of the illumination surface of the liquid crystal panel 31 have a conjugate relationship with each other. As a result, an image of the composite function element 40 is imaged on the illumination surface of the liquid crystal panel 31; that is, an image on the illumination surface reflects a sectional shape of a light beam on the composite function element 40 that has an approximately uniform illuminance distribution as a result of the beam shape conversion. Therefore, the loss of light due to defocusing can be reduced and the light utilization efficiency can be increased. (Design method of optical system)

Next, a specific design method of an optical system will be described in detail by referring the fourth embodiment of FIG. 6 as an example. Values of principal parameters of the optical system are set as follows:

Width of liquid crystal panel 31: AXP=60.48 mm

Height of liquid crystal panel 31: AYP=33.60 mm

First focal length of reflector 22: F1=10 mm

Second focal length of reflector 22: F2=180 mm

Distance between element 24 and element 40: DAB=40 mm

Distance between prism and lens: DPL=190 mm

Radius of curvature of incident surface of element 24: R1=600 mm (concave surface; the center is located on the optical axis)

Radius of curvature of incident surface of element 40: R2=600 mm (concave surface; the center is located on the optical axis)

Radius of curvature of incident surface of prism array 38: R3=23.5 mm (convex surface; the center is at the center of each prism)

Naturally, the spirit of the invention is not limited by the above specific values. For ease of description, the first element 24 which is part of the light beam shape converter 38 is called element A, the composite function element 40 is called element B, and the second prism array 39 is called element P. Although all of their incident surfaces are assumed to be spherical surfaces, the invention is not limited to such a combination.

The size of the effective area of the element P is restricted by the focal length of the lens 30 and the allowable incident angle of the liquid crystal panel 31. If the size of the effective area of the element P is set larger than the size thus determined, light enters the liquid crystal panel 31 at an angle larger than the allowable incident angle. Thus the size of the effective area of each prism is determined from the above limitation. On the other hand, since the arc area has a finite size, the spot size of a light beam also has a finite size at the arc area. Therefore, the size of the element P restricts the efficiency. This is the essential restriction determined by the characteristics of the liquid crystal panel 31 and the size of the arc (light-emitting region) of the light source. The same kind of restriction is necessarily imposed irrespective of the configuration of an optical system. The optimization of the curved surfaces of the elements A and B in this invention is intended to realize performance that is dose to a limit that is determined by such a restriction.

In the optimization, a function form is assumed that several unknown parameters are incorporated into a function $h(x,y)$ that represents a curved surface of an element, and values of the unknown parameters are determined so that a weighted sum of squares of coordinate differences (distances) between actual arrival points and target points of typical sample rays becomes a minimum.

In the past, a phase transfer function was optimized by employing a thin-element approximation. On the contrary, in this embodiment, an element shape itself is optimized because each element is designed as a thick element. However, where optimization of a phase transfer function is sufficient from the viewpoint of the layout of an optical system, allowable errors, or the like, a certain level of performance may be attained without considering the thick element. When an element is characterized by a phase transfer function, the deflection angle for a ray can be calculated and expressed analytically. Therefore, a program can be developed easily and the calculation can be conducted in a short time. On the other hand, in the case of the thick element, a position on an element surface where a ray strikes it is calculated by a recursive process, an orientation of the surface at that position is calculated, and a traveling direction of the ray after passing the boundary surface is calculated according to the law of refraction. Further, in general, a Jacobian (a determinant of partial derivatives of coordinates of arrival points of rays with respect to parameters as subjects of optimization) cannot be calculated analytically. Therefore, the invention employs a method of calculating an approximated value of a Jacobian by calculating differences from calculation results obtained by slightly varying the parameter values.

The following function is used as a function $h(x,y)$ that represents a curved surface shape of the exit surface of the element A.

$$h(x,y)=\Sigma_{KL}C_{KL}r^L\cos K\theta \quad (1)$$

In Equation (1), the summation of symbol $\Sigma$ is performed for integers 1 to 8 for L and for even numbers 0 to 10 for K (48 terms in total). Accordingly, the number of unknown parameters $C_{KL}$ as subjects of optimization is 48. As for a relationship between $(x,y)$ and $(r,\theta)$, $x=r\cdot\sin\theta$ and $y=r\cdot\cos\theta$. The function is symmetrical with respect to both x and y because it includes only cosine terms and K is only even numbers.

The element B is divided into four parts. However, since the function is symmetrical with respect to both the x-axis and the y-axis, if one of the four divisional parts is designed, the other three parts can be determined by performing symmetric conversion on the one part. Therefore, designing is performed in a region of $x\geq 0$ and $y\geq 0$. Since there is no singular point such as the center of a circle, the following function form is employed:

$$h_B(x,y)=\Sigma_{KL}D_{KL}x^Ky^L \quad (2)$$

In Equation (2), the summation of symbol $\Sigma$ is performed for all combinations of K and L where K and L are non-negative integers and L+K is more than 1 to less than 8 (44 terms in total). Accordingly, the number of unknown parameters $D_{KL}$ is 44.

For the value of an evaluation function to become small, the number of unknown parameters needs to be set high. However, convergence to an improper solution may occur unless the number of unknown parameters is set sufficiently low as compared to the number of sample rays. That is, proper designing cannot be realized unless a model function has proper number of unknown parameters. It is understood that the above-described model is a proper function model because, for instance, an increase or decrease in the number of parameters does not cause remarkable variations in the function value or the element performance. However, this means that the specific function form and the number of parameters need not be limited to those of the above model as long as the proper number of unknown parameters is secured; that is, some other function form may be used.

In the optimization, it is necessary to determine a certain number of typical sample rays and their arrival points. Since the system is symmetrical with respect to both the x-axis and the y-axis, sample rays are set in the region of $x\geq 0$ and $y\geq 0$. In the designing of this embodiment, 187 sample rays are set. To set such a large number of sample rays, it is desirable that the positions of target points of the respective rays be settable according to a predetermined procedure that can be executed by a computer. The process for the element B can be easily done because the optimization may be performed such that rays that have passed through the element B converge at one point. On the other hand, for the element A, the setting of target points is an important factor because a light beam that has passed through element A should be distributed to illuminate a rectangular region uniformly at the position of the element B.

In the design method of this embodiment, mapping is defined first and coordinates that are determined by the mapping from coordinates of a start point of a light ray are set as the target point. It is assumed that each sample ray is emitted from an aperture surface of the reflector 22 and that the sample ray reaches an imaginary plane that is located at the position where the element B is disposed. In this case, the mapping is a rule for correlating position coordinates on the aperture surface of the reflector with coordinates on the imaginary plane at the position of the element B.

The appropriateness of utilizing the mapping in this case is understood in the following manner. If an ideal element were obtained, some mapping would be defined in relation to the function of the ideal element. Therefore, if target points were set according to such mapping, the ideal element would be designed. However, unfortunately, a specific expression of such ideal mapping is unknown. There remains a factor that requires improvement with some trial and error. Therefore, the following model is used for formulation of mapping that is more in generality and can be improved in a more predictable manner, and the designing is performed based on that model.

First, the mapping method from the aperture surface of the reflector 22 to the plane at the position of the element B is divided into two steps. By using the polar coordinate system, a point $P_1(r_1,\theta_1)$ on the aperture surface of the reflector 22 is correlated with a point $P_0(r_{01},\theta_{01})$ in a unit circular region, which is then correlated with a point $P_2(r_2,\theta_2)$ in a rectangular region.

It is assumed that a light intensity distribution on the aperture surface of the reflector 22 is given by $f(r_1)$ as function of radius $r_1$. In the angular direction, an equality $\theta_0=\theta_1$ is employed. In the radial direction, $r_0$ is given as follows based on the following condition that corresponds to a case that the light intensity distribution is uniform in the unit circular region:

$$\int_0^{r_0} r\,dr / \int_0^1 f(r)r\,dr = \int_0^{r_1} f(r)r\,dr / \int_0^{r_{1max}} f(r)r\,dr \quad (3)$$

That is, $$r_0 = \{f_{11}(r_1)\}^{1/2} \quad (4)$$

where $$f_{11}(r_1) = \int_0^{r_1} f(r)r\,dr \Big/ \int_0^{r_{1\max}} f(r)r\,dr \quad (5)$$

Next, the second mapping step will be discussed. A closed curve group having parameter $\eta$ is assumed which is expressed as follows:

$$r = g(\theta, \eta) \quad (6)$$

where $0 \leq \eta \leq 1, \partial g/\partial \eta \geq 0$

It is assumed that a circle that is defined $r_0=$const. is mapped by the second mapping to a closed curve corresponding to a particular value of $\eta$.

A weight function $w(r,\theta)$ is assumed which corresponds to the light intensity distribution after the mapping. The value of $\eta$ is defined by the following condition:

$$\int_0^{r_0} r\,dr \Big/ \int_0^1 r\,dr = \quad (7)$$

$$\left[ \int_0^{2\pi}\int_0^{g(\theta,\eta)} w(r,\theta)r\,dr\,d\theta - \int_0^{2\pi}\int_0^{g(\theta,0)} w(r,\theta)r\,dr\,d\theta \right] \Big/$$

$$\left[ \int_0^{2\pi}\int_0^{g(\theta,1)} w(r,\theta)r\,dr\,d\theta - \int_0^{2\pi}\int_0^{g(\theta,0)} w(r,\theta)r\,dr\,d\theta \right]$$

That is, $$\eta = f_{12}^{-1}(r_0^2) \quad (8)$$

where $f_{12}^{-1}(\eta)$ is the function on the right side of Equation (7).

The angle $\theta_2$ is derived by the following condition (here, $0 \leq \theta_0 \leq \pi/2$):

$$\theta_0/(\pi/2) = \int_0^{\theta_2} w(r,\theta)g(\theta,\eta)[\partial g(\theta,\eta)/\partial \eta]\,d\theta \Big/ \quad (9)$$

$$\int_0^{\pi/2} w(r,\theta)g(\theta,\eta)[\partial g(\theta,\eta)/\partial \eta]\,d\theta$$

That is, $$\theta_2 = f_{13}^{-1}(2\theta_0/\pi) \quad (10)$$

where $f_{13}(\theta_2)$ is the function on the right side of Equation (9). Once $\eta$ and $\theta_2$ are derived, then the radius $r_2$ is derived by using $\eta$ and $\theta_2$ as $r_2 = g(\theta_2, \eta)$.

The reason why the mapping is performed in two steps via the unit circular region is to allow several ways of attempting to set sample rays. If sample rays are set to have an uniform density distribution in the unit circular region, their density on the aperture surface of the reflector 22 can be set proportionally to the intensity. However, in this embodiment, it is not necessary to employ a precise uniform density distribution. Instead, radius values are varied eleven ways in the unit circular region and a quarter circumference is equally divided into seventeen parts for each case, whereby $17 \times 11 = 187$ emitting points of sample rays are set.

Next, a description will be made of a process related to the light intensity distribution on the aperture surface of the reflector 22. In the following equations, the function $f(r)$ is set based on a theoretical light intensity distribution $f_{INT}(r)$ that is obtained when a point light source having an isotropic emission characteristic is placed at the focal point of the reflector 22. Furthermore, the radius of the aperture surface of the reflector 22 is denoted by $r_{max0}$ and the radius of the center hole of the reflector 22 is denoted by $r_{min0}$, respectively.

The function $f(r)$ is defined as follows because an integral value multiplied by r is used: Range of definition:

$$[r_{min1}, r_{max1}] \quad r_{min1} \leq r_{min0} < r_{max0} \leq r_{max1}$$

Function value:

$$rf(r) = f(r_{min0}) \cdot (r - r_{min1})/(r_{min0} - r_{min1})$$

$$(r_{min1} \leq r \leq r_{min0})$$

$$rf_{INT}(r)f_1(r)f_2(r)$$

$$(r_{min0} \leq r \leq r_{1B})$$

$$rf_{INT}(r_{1B})f_1(r_{1B})f_2(r_{1B})$$

$$(r_{1B} \leq r \leq r_{max1})$$

where $$f_1(r) = 1 - (1 - f_{OUT}) \cdot (r/r_{max0})^2$$

$$f_2(r) = 1 - (1 - f_{IN}) \cdot \exp\{-\log_e 2 \cdot [(r - r_{min0})/w_{IN}]^2\}$$

In the above equations, $r_{min1}$ is set to represent a point that is slightly the center hole, and is to correct a discontinuity that occurs in numerical calculations. Also, $r_{max1}$ is set to represent a point that is slightly deviated to outside of the aperture of the reflection, and is to avoid a possible irregularity in the peripheral region by setting somewhat larger than $r_{max0}$. Here, $r_{max1}$ is simply set to 1.1 times the value of $r_{max0}$. The function $f_1(r)$ is to adjust intensity in a peripheral region and the function $f_2(r)$ is to adjust intensity in a central region. There may occur a case where the characteristics are improved by properly adjusting these parameters when a satisfactory solution is not obtained due to influence of the change of arc region or some other factors. At present, the possibility of executing such a process is left. However, since it has been confirmed that a certain reliability of performance can be obtained without executing such a process, here both of $f_{OUT}$ and $f_{IN}$ are given a value 1.0 and hence a relationship $f_1(r) = f_2(r) = 1$ holds. Further, parameter $r_{1B}$ is introduced arbitrarily to secure stability of solutions. As a value of $r_{1B}$ is increased, the light intensity distribution becomes closer to the theoretical distribution. However, in such a case, since the peripheral light intensity is very low, a resulting solution becomes unpractical; for instance, there may occur a phenomenon that the peripheral rays are bent inward. Therefore, high performance can be obtained by judging whether desired functions are realized by checking the performance by simulation or the like, and then making adjustments if necessary.

Next, a description will be made of a model of closed curves. The function $g(\theta,\eta)$ is set by a method of assuming two profiles where $\eta$ is 0 and 1. An x-coordinate of a point where a curve $r=g(\theta,1)$ that corresponds to the outer periphery intersects the x-axis is denoted by $a_{X1}$, and a y-coordinate of a point where the curve intersects the y-axis is denoted by $a_{Y1}$, respectively. An x-coordinate of a point where a curve $r=g(\theta,0)$ that corresponds to the inner periphery intersects the x-axis is denoted by $a_{X2}$, and a y-coordinate of a point where the curve intersects the y-axis is denoted by $a_{Y2}$, respectively. The shape of curves in a peripheral region and that in a central region are made different from each other. For smooth interpolation of curves between the two regions, the following process is executed.

First, a curve $|x/a_{X1}|^{N1}+|y/a_{Y1}|^{N1}=1$ is assumed. The following discussion will be directed to the first quadrant ($x \geq 0, y \geq 0$) and hence the symbol of absolute value can be removed. In the other quadrants, designing can be performed similarly to the first quadrant because of the symmetry. If N1 is equal to 2, the above curve represents an ellipse. As the value of N1 increases, the curve becomes closer to a rectangle. Parameter N1 need not always be an integer and may be an arbitrary real number. This curve is written as $$r=P_1(\theta) = \{1.0/[(\cos\theta/a_{X1})^{N1}+(\sin\theta/a_{Y1})^{N1}]\}^{1/N1} \quad (11)$$

A curve $(x/a_{X1})^2+(y/a_{Y1})^2=1$ is written as $$r=P_{r1}(\theta) = [1.0/\{(\cos\theta/a_{X1})^2+(\sin\theta/a_{Y1})^2\}]^{1/2} \quad (12)$$

By using the above equations, the outermost curve is defined as follows:

$$r_1(\theta)=P_{r1}(\theta)\times\{P_1(\theta)/P_{r1}(\theta)\}^{q1} \quad (13)$$

Since q1 is set at 1 in this embodiment, Equation (13) becomes $r_1(\theta)=P_1(\theta)$. However, by using a model having parameter q1, a possibility of increasing the flexible designing can be secured.

A similar process is executed for the inner periphery. First, a curve $(X/a_{X2})^{N2}+(Y/a_{Y2})^{N2}=1$ is assumed. This curve is written as $$r=P_2(\theta) = [1.0/\{(\cos\theta/a_{X2})^{N2}+(\sin\theta/a_{Y2})^{N2}\}]^{1/N2} \quad (14)$$

A curve $(X/a_{X2})^2+(Y/a_{Y2})^2=1$ is assumed This curve is written as $$r=P_{r2}(\theta) = [1.0/\{(\cos\theta/a_{X2})^2+(\sin\theta/a_{Y2})^2\}]^{1/2} \quad (15)$$

By using the above equations, the innermost curve is assumed as follows:

$$r_2(\theta)=P_{r2}(\theta)\times\{P_2(\theta)/P_{r2}(\theta)\}^{q2} \quad (16)$$

In the case being discussed, q2 is set at −2 so that the shape of the closed curve becomes somewhat dose to a rhombus.

Closed curves of a case where parameter $\eta$ is in a range of $0<\eta<1$ are set in such a manner that points that internally divide intervals between $r_1$ and a curve obtained by scaling up $r_2$ by a coefficient of $A_{mag}$ in a ratio of $\eta:(1-\eta)$ and then scaled down. Specifically, closed curves are expressed as $$r=g(\theta,\eta)=[r_1\cdot\eta+r_2\cdot(1-\eta)A_{mag}]\cdot\{[(1-\eta)/A_{mag}]+\mu\} \quad (17)$$

A derivative of this function with respect to $\eta$ is given by $$g(\theta\eta)/\eta=[r_1-r_2\cdot A_{mag}]\cdot\{[(1-\eta)/A_{mag}]+\mu\}+[r_1\cdot\eta+r_2\cdot(1-\eta)A_{mag}]\{1-(1/A_{mag})\} \quad (18)$$

Next, a weight function is introduced to provide a margin in formulating a target light intensity distribution and to secure a flexibility for adjustments in actual designing. Because the purpose is to realize an uniform light intensity distribution, usually it is simple and natural to make the weight function $w(r,\theta)$ a constant value. However, because an actual light source has a certain size, it does not always provide a uniform light intensity distribution. Therefore, it is expected that the uniformity of a finally obtained light intensity distribution can be improved by setting the weight function as $w(r,\theta)$ intentionally so that it compensates for such nonuniformity.

The weight function $w(r,\theta)$ may be used positively to set the target light intensity distribution to a desired one. In liquid crystal projectors, the peripheral luminance is much lower than the central luminance because of the presence of elements such as a field lens, a projection lens, and a screen that are provided downstream of a liquid crystal panel. To compensate for this difference in luminance, it is desired to make the peripheral region on the liquid crystal panel brighter than the central region. It is difficult for conventional optical systems to realize such illumination. However, the embodiments of the invention can easily realize such illumination by setting a proper weight function $w(r,\theta)$ because of the use of free surfaces that are defined by many parameters.

In the case where a light beam is divided into four beams and the four divisional beams are superimposed one on another, a peripheral portion of the aperture and regions dose to the x-axis and the y-axis of the element B contribute to the illumination for a peripheral region of the liquid crystal panel. Therefore, the following function is employed which has large values in those regions:

$$w(r, \theta) = 1 + [\{a_1\exp[-2\{x/w_{a1}\}^2]\}^2 + \{a_2\exp[-2\{y/w_{a2}\}^2]\}^2 + \{a_3\exp[-2\{(x-AXP/2)/w_{a3}\}^2]\}^2 + \{a_4\exp[-2\{(y-AYP/2)/w_{a4}\}^2]\}^2]^{1/2} \quad (19)$$

In the design being discussed, the peripheral illuminance is enhanced by employing the following settings:

$a_1=a_3=2.0, a_2=a_4=1.5,$ $w_{a1}=w_{a3}=5.0, w_{a2}=w_{a4}=3.0$

As described above, a model having a high flexibility for designing is used in both cases of setting closed curves and setting a weight function. This is also effective in actual designing. Ideally, it is desirable that finally obtained conversion characteristics be independent of the details of the method of setting target points. However, at present, there is no specific means for knowing ideal functions and therefore it is necessary to make adjustments by some trial and error to determine values of such parameters of mapping. In that time, it is effective that parameters whose relationships with characteristics that are predicted by a simulation are easily recognized and are naturally incorporated into a model as design parameters. The above-described models are effective in this sense. For example, $N_1$ (closeness to a rectangle), $A_{mag}$ (parameter for an adjustment of a process of a change from the shape of an inner peripheral region to the shape of an outer peripheral region), $a_1, a_2, a_3, a_4$ (degree of enhancement of peripheral illuminance), and $w_1, w_2, w_3, w_4$ (width of regions of illuminance enhancement) are incorporated in the models as parameters whose meanings are easily recognized.

However, the invention is not necessarily limited to such models and closed curves and a weight function may be set in different manners. The invention is mainly intended to realize the concept of effectively utilizing flexible designing of each curved surface so that a final light intensity distribution at the liquid crystal panel becomes a desired one.

Next, a description will be made of a design procedure of the element B. In the above-described designing of the element A, rays that do not exist actually are assumed to be outside the periphery as sample rays so that rays in a peripheral region of the opening of the reflector do not exhibit peculiar behavior. Since such rays hinder the designing of the element B, the optimization is performed by using only actual rays. That is, sample rays are newly set in the opening of the reflector and their paths including passage through the element A and refraction at the incident surface of the element B are determined by a way of ray tracing. Resulting rays are employed as initial conditions of sample rays for the optimization. A target point is set at the center of the exit surface of the element P under the consideration of a spherical surface shape of the incident surface of the element P.

Values of parameters are determined by an optimizing calculation that uses a function form and a target point thus set. Actual designing will be described below in more detail.

Figure 7:
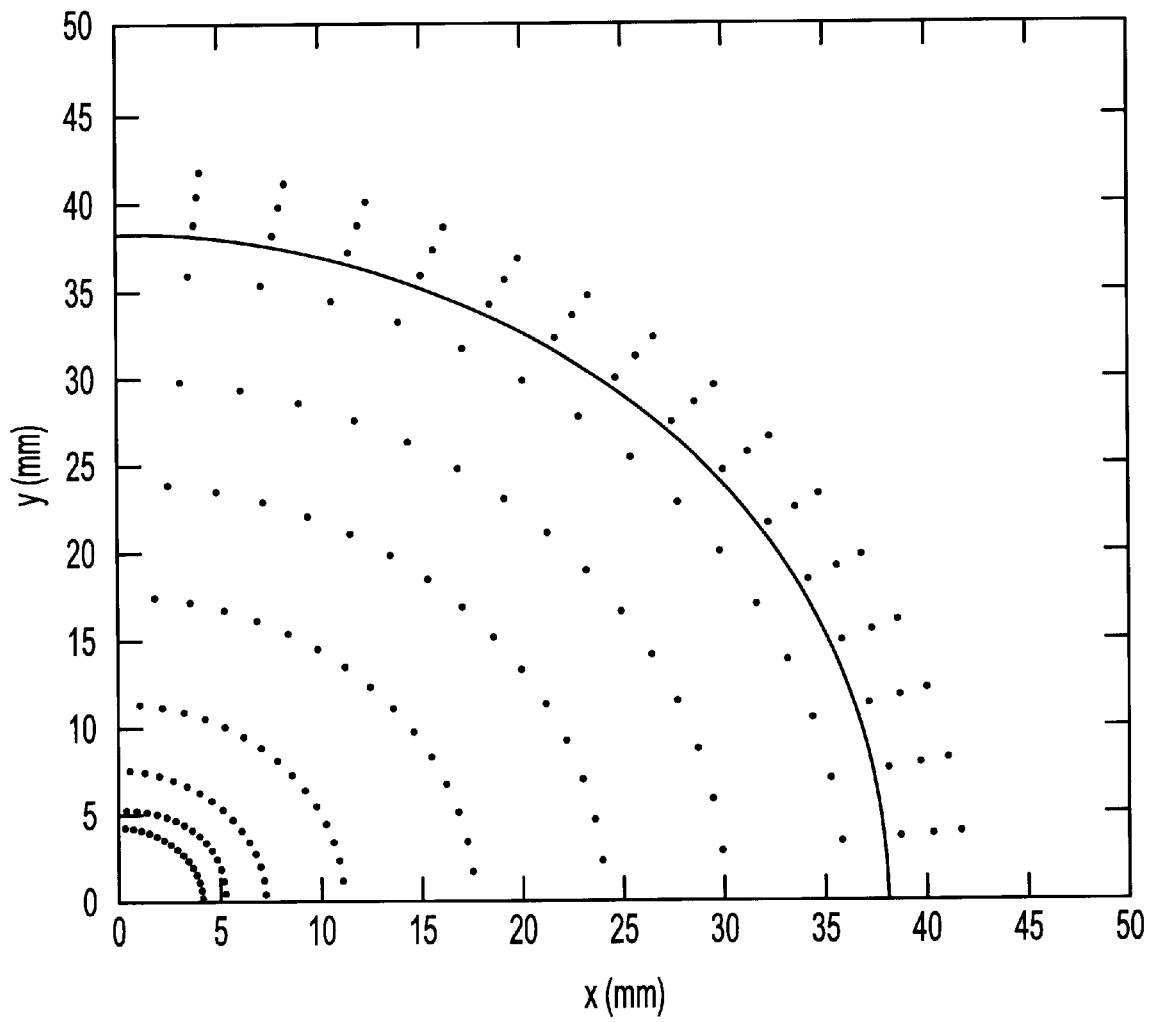
FIG. 7 shows positions of sample rays on an aperture surface of a reflector, that were used to design an illumination apparatus according to the invention.
Figure 8:
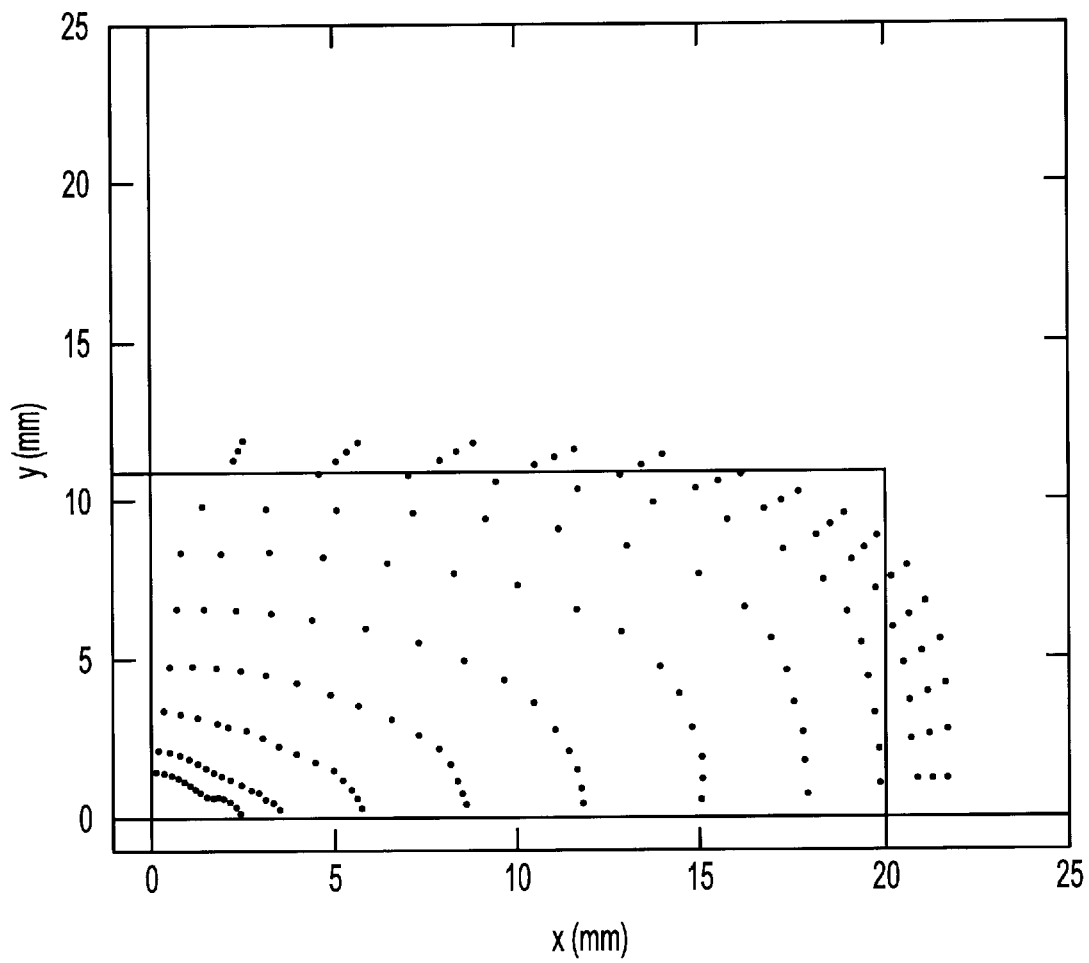
FIG. 8 shows target points that were used to design the illumination apparatus according to the invention.
Figure 9:
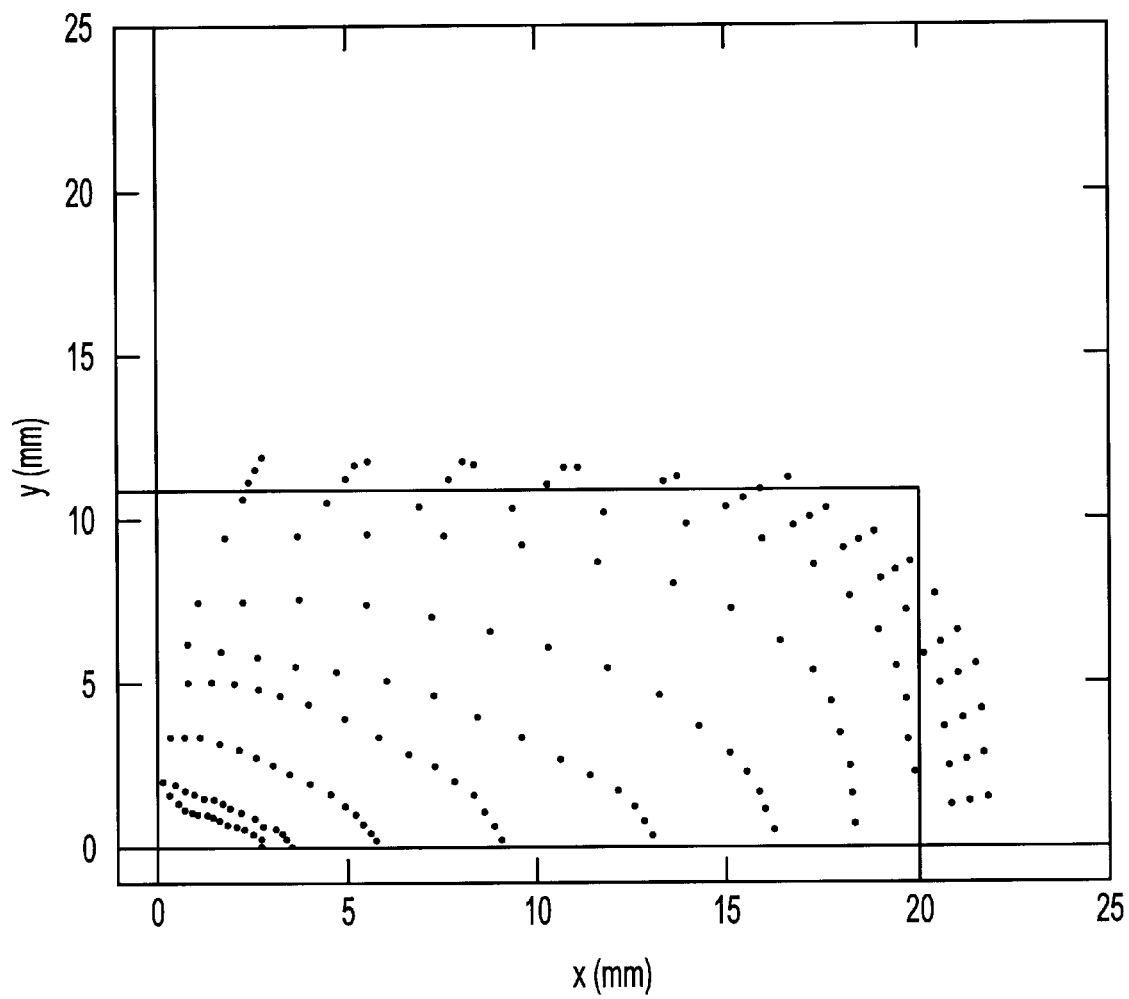
FIG. 9 shows actual arrival points determined by a model-based calculation, that were used to design the illumination apparatus according to the invention.

FIG. 7 shows positions of sample rays on the aperture surface of the reflector that were used in designing the element A. FIG. 8 shows target points, and FIG. 9 shows arrival points that were determined by a model-based calculation. It is understood that the optimization allows the result to properly reflect the design intent and illumination of roughly a rectangular region is attained. Tables 1 and 2 show values of configuration parameters of the element A and the element B, respectively, those were determined by the optimization.

Figure 10:
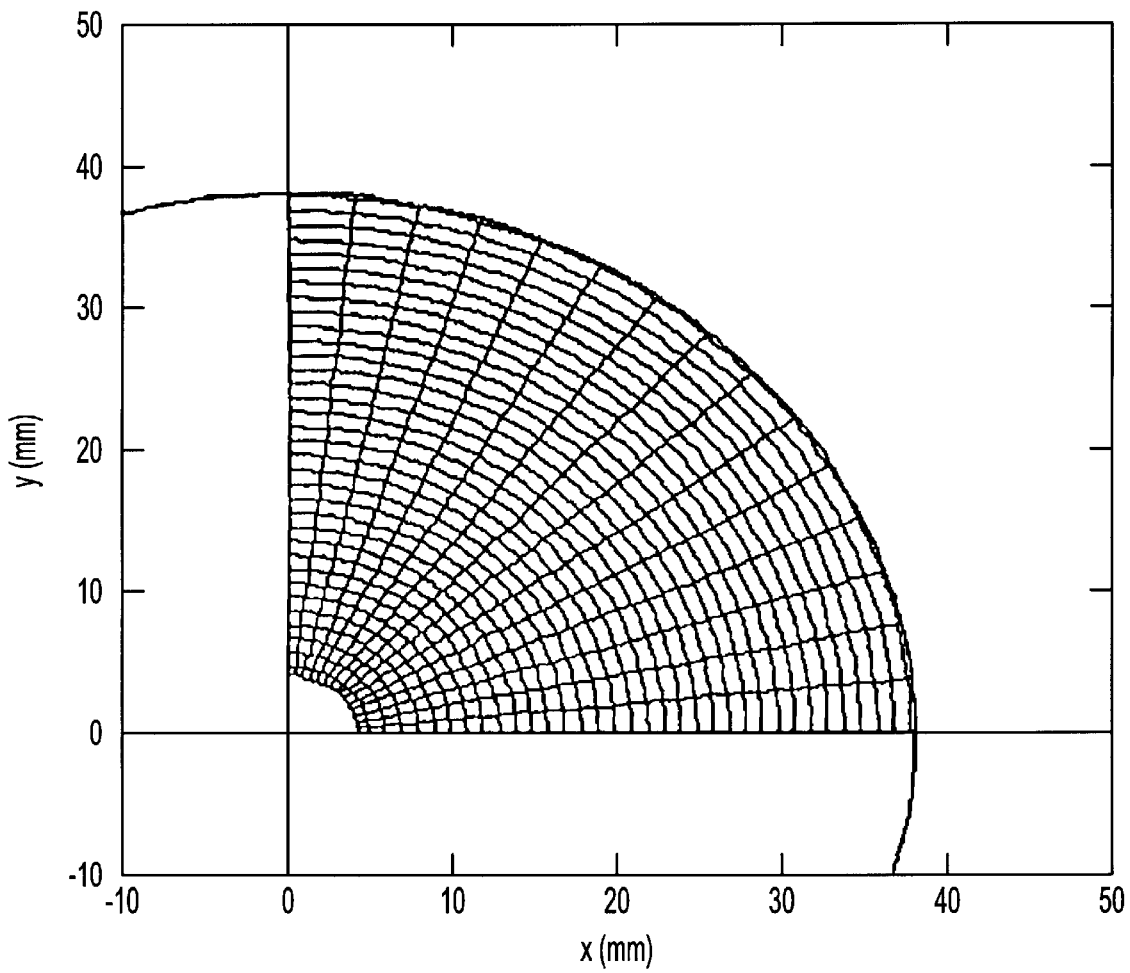
FIG. 10 shows an arachnoid pattern that was defined at the aperture of the reflector to design the illumination apparatus according to the invention.
Figure 11:
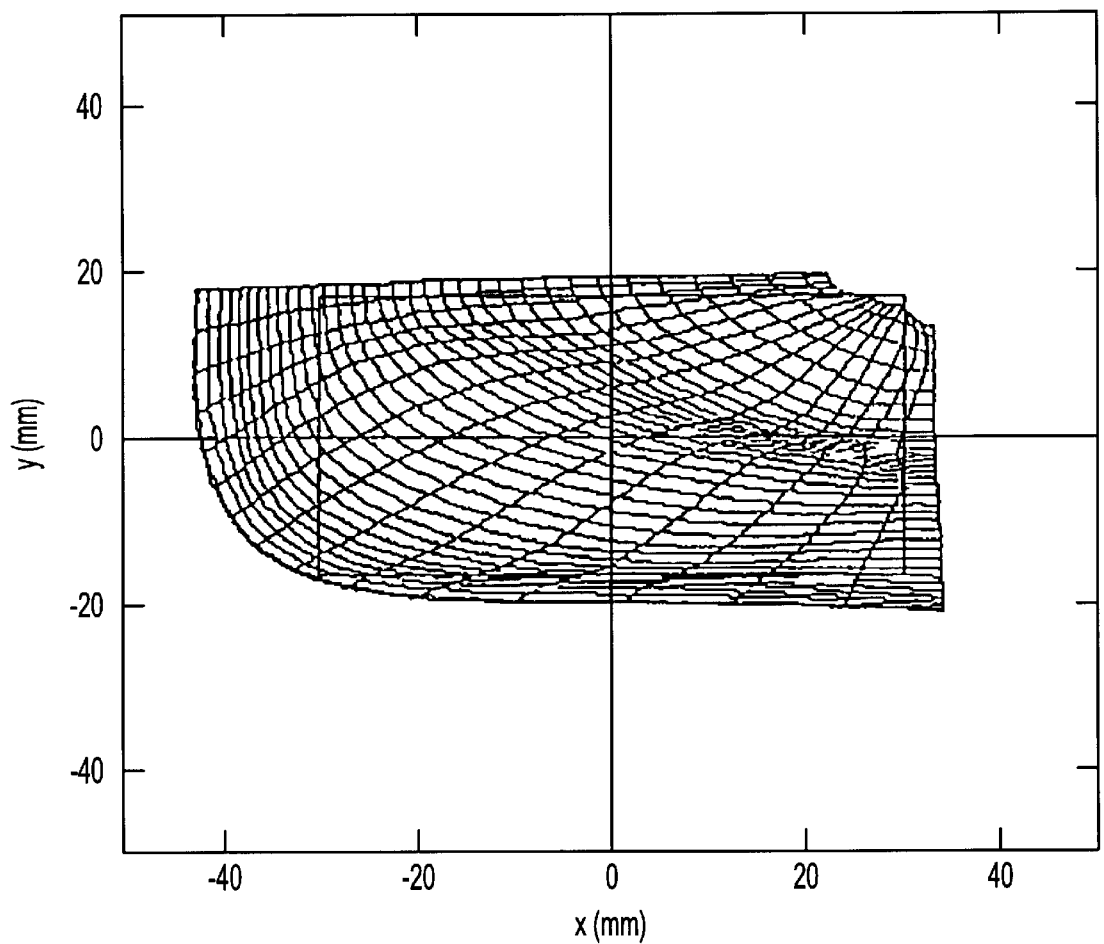
FIG. 11 shows a corresponding pattern that was formed at the position of a liquid crystal panel by rays emitted from the arachnoid pattern of FIG. 10.

In an evaluation of characteristics, it is necessary to check rays other than the sample rays. FIG. 10 shows an arachnoid pattern that was defined on the aperture of the reflector, and FIG. 11 shows a corresponding pattern that was formed at the position of the liquid crystal panel by rays emitted from the arachnoid pattern of FIG. 10. It is seen that smooth shape conversion is attained.

Further, to predict performance, since the arc has a certain size, a calculation for illuminance distribution was performed by a Monte Carlo method. A model for a light source was set such that a number of isotropic point light sources are distributed in a cylindrical region having dimensions of the arc. The diameter and the length of the cylindrical region were set at 0.7 mm and 1.5 mm, respectively. The cylindrical region was divided into three equal regions in an axial direction. The distribution densities of the point light sources in front and rear regions were set uniformly, and the density of the central region was set at a half of that of the front and rear regions to account for the fact that the luminance is higher in the vicinity of the electrodes. The center of the arc was set at a position that is deviated forward from the first focal point of the reflector by 0.1 mm, that is in the direction apart from the reflector.

Figure 12:
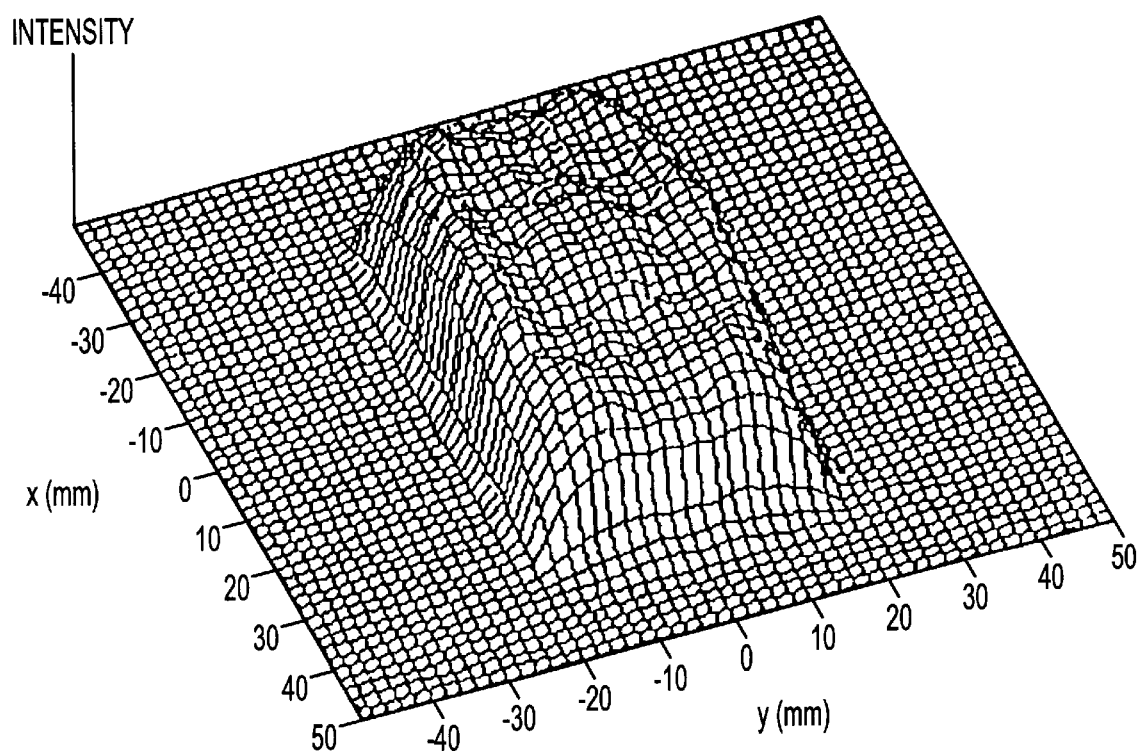
FIGS. 12–14 are a perspective view, a horizontal sectional view, and a vertical sectional view, respectively, of a predicted luminance distribution on the liquid crystal panel according to the invention.
Figure 13:
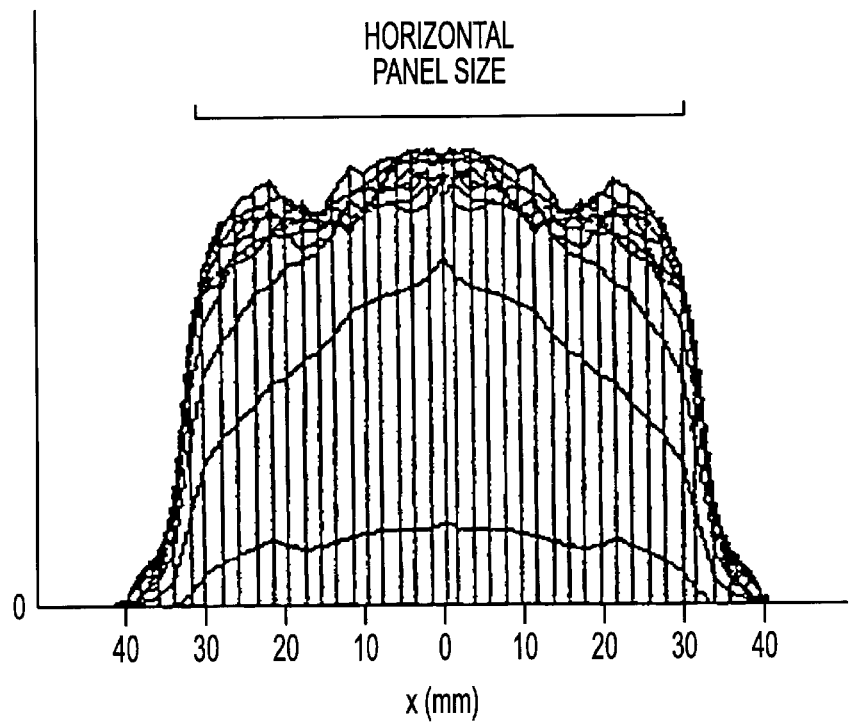
Figure 14:
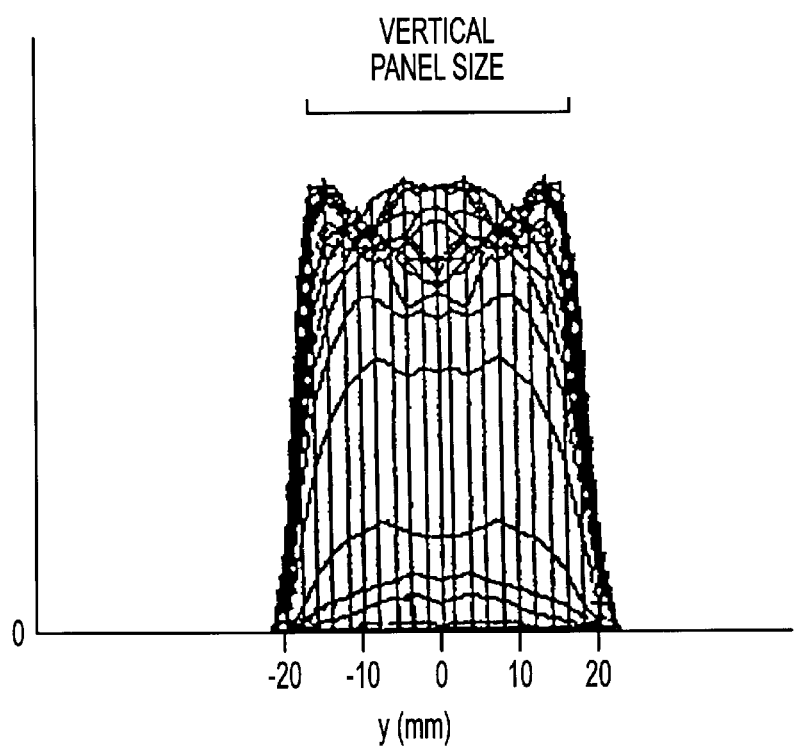

A light beam that has passed through the panel is attenuated by the projection lens and the screen in a process of reaching the screen. The attenuation amount increases as the position approaches the periphery of the screen, and the intensity is approximately become half at the screen corners. To estimate influence of such attenuation in a simple and easy manner and utilize estimated results in the designing, it is effective to apply a proper model relative to the influence approximately even though it is not a precise one. Based on this understanding, to provide an index of luminance uniformity of a displayed image that is observed on the screen, a profile was calculated that was a predicted light intensity distribution on the panel surface multiplied by the following function:

$$a(r)=1-(1/2)r^2/\{(AXP/2)^2+(AYP/2)^2\} \qquad (20)$$

where r is the distance from the center, and AXP and AYP are horizontal and vertical panel sizes. This is a model that the luminance decreases in proportion to the square of the distance from the center and a 50% attenuation occurs at the four screen corners. The profile thus calculated corresponds to a predicted luminance profile that would be obtained when the screen is observed. FIGS. 12, 13, and 14 show a perspective view, a horizontal view and a vertical view of a prediction result of a luminance distribution on the screen, respectively.

Tables 3 and 4 show numerical values of the details of light utilization efficiency and illuminance uniformity, respectively.

The simulation predicts that a light utilization efficiency ((effective illumination light quantity)/(reflector reflection light quantity)) of about 48% and a periphery-to-center intensity ratio (after conversion into values on the screen) of about 42% will be obtained.

As described above, according to the embodiments of the invention, a high luminance uniformity and high light utilization efficiency can be attained while a high directivity is realized in an illumination optical system of a liquid crystal projector or the like.

The invention is not limited to the configurations of the respective embodiments. For example, although each embodiment is directed to the case where the reflector has an ellipsoidal surface, it may have a paraboloidal surface or a surface of some other shape. The effect of the invention increases as traveling directions of rays are restricted in a narrower angular range so that the rays occupy a smaller region at the position of the element. A Although in each embodiment the optical axis is a straight line, it may be bent (here, 'bent' includes reflected, refracted and diffracted) anywhere by using a mirror prism or a grating. The optical axis of the projection lens may either coincide with or deviate from that of the illumination system. As already mentioned above, the division number of the light beam is not limited to four (division along the vertical and horizontal dividing lines) and may be smaller or larger than four.

Also, no limitation is imposed on a specific algorithm for setting target points. In the above embodiment, as for the function f(r) that represents a light intensity distribution on the opening surface of the reflector, mapping is set based on the theoretical light intensity distribution $f_{INT}(r)$ that is obtained when an isotropic point light source is placed at the focal point of the reflector. However, the invention is not limited to such a case. A light intensity distribution calculated by assuming a light source model having a finite size, a measured light intensity distribution, or a function obtained by processing it in a proper manner may be used. A light intensity distribution may even be set by making judgments properly to each ray on a one-by-one basis without defining mapping. The above modifications do not depart from the spirit of the invention that is intended to realize high directivity, uniformity, and efficiency, and are therefore included in the scope of the invention.

It is possible to apply the light shield plate 50 of the third embodiment and/or the prism array 39 of the fourth embodiment to the configuration of the first embodiment.

As described above, according to the invention, the uniformity of an illuminance distribution and the light utilization efficiency can be improved while high directivity of light is maintained by subjecting a light beam that has been uniformized by the light beam shape conversion to the division and superimposition. Therefore, by using an illumination apparatus of the invention in a projection type image display apparatus such as a liquid crystal projector, projected images that are free of luminance nonuniformity can be obtained.

TABLE 1

Configuration Parameters of Element A

| n | Coefficients C (n) Element-1 | Term |
|---|---|---|
| 1 | 0. 171615893E+00 | C (n) ‡R‡‡ 1‡cos ( 0‡theta) |
| 2 | −0. 774363472E−01 | C (n) ‡R‡‡ 2‡cos ( 0‡theta) |
| 3 | 0. 152278848E−01 | C (n) ‡R‡‡ 3‡cos ( 0‡theta) |
| 4 | −0. 145951534E−02 | C (n) ‡R‡‡ 4‡cos ( 0‡theta) |
| 5 | 0. 765842541E−04 | C (n) ‡R‡‡ 5‡cos ( 0‡theta) |
| 6 | −0. 225446659E−05 | C (n) ‡R‡‡ 6‡cos ( 0‡theta) |
| 7 | 0. 349618442E−07 | C (n) ‡R‡‡ 7‡cos ( 0‡theta) |
| 8 | −0. 222575318E−09 | C (n) ‡R‡‡ 8‡cos ( 0‡theta) |
| 9 | 0. 214120884E−01 | C (n) ‡R‡‡ 1‡cos ( 2‡theta) |
| 10 | −0. 137155743E−01 | C (n) ‡R‡‡ 2‡cos ( 2‡theta) |
| 11 | 0. 214025356E−02 | C (n) ‡R‡‡ 3‡cos ( 2‡theta) |
| 12 | −0. 240783644E−03 | C (n) ‡R‡‡ 4‡cos ( 2‡theta) |
| 13 | 0. 132731547E−04 | C (n) ‡R‡‡ 5‡cos ( 2‡theta) |
| 14 | −0. 375346446E−06 | C (n) ‡R‡‡ 6‡cos ( 2‡theta) |
| 15 | 0. 528379283E−08 | C (n) ‡R‡‡ 7‡cos ( 2‡theta) |
| 16 | −0. 292296491E−10 | C (n) ‡R‡‡ 8‡cos ( 2‡theta) |
| 17 | −0. 286310475E−01 | C (n) ‡R‡‡ 1‡cos ( 4‡theta) |
| 18 | 0. 155371702E−01 | C (n) ‡R‡‡ 2‡cos ( 4‡theta) |
| 19 | −0. 300462291E−02 | C (n) ‡R‡‡ 3‡cos ( 4‡theta) |
| 20 | 0. 308560899E−03 | C (n) ‡R‡‡ 4‡cos ( 4‡theta) |
| 21 | −0. 171275199E−04 | C (n) ‡R‡‡ 5‡cos ( 4‡theta) |
| 22 | 0. 515090615E−06 | C (n) ‡R‡‡ 6‡cos ( 4‡theta) |
| 23 | −0. 794316371E−08 | C (n) ‡R‡‡ 7‡cos ( 4‡theta) |
| 24 | 0. 493744005E−10 | C (n) ‡R‡‡ 8‡cos ( 4‡theta) |
| 25 | −0. 741037647E−02 | C (n) ‡R‡‡ 1‡cos ( 6‡theta) |
| 26 | 0. 449040514E−02 | C (n) ‡R‡‡ 2‡cos ( 6‡theta) |
| 27 | −0. 102793415E−02 | C (n) ‡R‡‡ 3‡cos ( 6‡theta) |
| 28 | 0. 114012633E−03 | C (n) ‡R‡‡ 4‡cos ( 6‡theta) |
| 29 | −0. 677205894E−05 | C (n) ‡R‡‡ 5‡cos ( 6‡theta) |
| 30 | 0. 222207421E−06 | C (n) ‡R‡‡ 6‡cos ( 6‡theta) |
| 31 | −0. 380182692E−08 | C (n) ‡R‡‡ 7‡cos ( 6‡theta) |
| 32 | 0. 264855318E−10 | C (n) ‡R‡‡ 8‡cos ( 6‡theta) |
| 33 | −0. 113821331E−01 | C (n) ‡R‡‡ 1‡cos ( 8‡theta) |
| 34 | 0. 719679947E−02 | C (n) ‡R‡‡ 2‡cos ( 8‡theta) |
| 35 | −0. 166025312E−02 | C (n) ‡R‡‡ 3‡cos ( 8‡theta) |
| 36 | 0. 183172507E−03 | C (n) ‡R‡‡ 4‡cos ( 8‡theta) |
| 37 | −0. 108367681E−04 | C (n) ‡R‡‡ 5‡cos ( 8‡theta) |
| 38 | 0. 352690492E−06 | C (n) ‡R‡‡ 6‡cos ( 8‡theta) |
| 39 | −0. 594636154E−08 | C (n) ‡R‡‡ 7‡cos ( 8‡theta) |
| 40 | 0. 405559480E−10 | C (n) ‡R‡‡ 8‡cos ( 8‡theta) |
| 41 | −0. 141085313E−01 | C (n) ‡R‡‡ 1‡cos (10‡theta) |
| 42 | 0. 873708210E−02 | C (n) ‡R‡‡ 2‡cos (10‡theta) |
| 43 | −0. 197771431E−02 | C (n) ‡R‡‡ 3‡cos (10‡theta) |
| 44 | 0. 216280169E−03 | C (n) ‡R‡‡ 4‡cos (10‡theta) |
| 45 | −0. 126949650E−04 | C (n) ‡R‡‡ 5‡cos (10‡theta) |
| 46 | 0. 409658116E−06 | C (n) ‡R‡‡ 6‡cos (10‡theta) |
| 47 | −0. 685256657E−08 | C (n) ‡R‡‡ 7‡cos (10‡theta) |
| 48 | 0. 464648741E−10 | C (n) ‡R‡‡ 8‡cos (10‡theta) |

TABLE 2

Configuration Parameters of Element B

| n | Coefficients D (n) Element-2 | Term |
|---|---|---|
| 1 | −0. 168234771E−01 | C (n) ‡X‡‡ 0 ‡Y‡‡ 1 |
| 2 | 0. 126581212E+00 | C (n) ‡X‡‡ 0 ‡Y‡‡ 2 |
| 3 | 0. 288177224E−01 | C (n) ‡X‡‡ 0 ‡Y‡‡ 3 |
| 4 | −0. 312213413E−01 | C (n) ‡X‡‡ 0 ‡Y‡‡ 4 |
| 5 | 0. 788250272E−02 | C (n) ‡X‡‡ 0 ‡Y‡‡ 5 |
| 6 | −0. 908824268E−03 | C (n) ‡X‡‡ 0 ‡Y‡‡ 6 |
| 7 | 0. 504459268E−04 | C (n) ‡X‡‡ 0 ‡Y‡‡ 7 |
| 8 | −0. 109454375E−05 | C (n) ‡X‡‡ 0 ‡Y‡‡ 8 |
| 9 | −0. 174889514E−01 | C (n) ‡X‡‡ 1 ‡Y‡‡ 0 |
| 10 | 0. 184968063E+00 | C (n) ‡X‡‡ 1 ‡Y‡‡ 1 |
| 11 | −0. 995090007E−01 | C (n) ‡X‡‡ 1 ‡Y‡‡ 2 |
| 12 | 0. 222642531E−01 | C (n) ‡X‡‡ 1 ‡Y‡‡ 3 |
| 13 | −0. 199249672E−02 | C (n) ‡X‡‡ 1 ‡Y‡‡ 4 |
| 14 | 0. 111600197E−04 | C (n) ‡X‡‡ 1 ‡Y‡‡ 5 |
| 15 | 0. 796374730E−05 | C (n) ‡X‡‡ 1 ‡Y‡‡ 6 |
| 16 | −0. 318079006E−06 | C (n) ‡X‡‡ 1 ‡Y‡‡ 7 |
| 17 | 0. 316014760E−01 | C (n) ‡X‡‡ 2 ‡Y‡‡ 0 |
| 18 | −0. 343117730E−01 | C (n) ‡X‡‡ 2 ‡Y‡‡ 1 |
| 19 | 0. 136954211E−01 | C (n) ‡X‡‡ 2 ‡Y‡‡ 2 |
| 20 | −0. 245533543E−02 | C (n) ‡X‡‡ 2 ‡Y‡‡ 3 |
| 21 | 0. 204512825E−03 | C (n) ‡X‡‡ 2 ‡Y‡‡ 4 |
| 22 | −0. 755763718E−05 | C (n) ‡X‡‡ 2 ‡Y‡‡ 5 |
| 23 | 0. 891024292E−07 | C (n) ‡X‡‡ 2 ‡Y‡‡ 6 |
| 24 | 0. 664953444E−02 | C (n) ‡X‡‡ 3 ‡Y‡‡ 0 |
| 25 | 0. 287135069E−02 | C (n) ‡X‡‡ 3 ‡Y‡‡ 1 |
| 26 | −0. 707263214E−03 | C (n) ‡X‡‡ 3 ‡Y‡‡ 2 |
| 27 | 0. 995108871E−04 | C (n) ‡X‡‡ 3 ‡Y‡‡ 3 |
| 28 | −0. 581523709E−05 | C (n) ‡X‡‡ 3 ‡Y‡‡ 4 |
| 29 | 0. 101657712E−06 | C (n) ‡X‡‡ 3 ‡Y‡‡ 5 |
| 30 | 0. 464944552E−04 | C (n) ‡X‡‡ 4 ‡Y‡‡ 0 |
| 31 | −0. 126106550E−03 | C (n) ‡X‡‡ 4 ‡Y‡‡ 1 |
| 32 | 0. 118215394E−04 | C (n) ‡X‡‡ 4 ‡Y‡‡ 2 |
| 33 | −0. 136109439E−05 | C (n) ‡X‡‡ 4 ‡Y‡‡ 3 |
| 34 | 0. 618281121E−07 | C (n) ‡X‡‡ 4 ‡Y‡‡ 4 |
| 35 | 0. 645484997E−04 | C (n) ‡X‡‡ 5 ‡Y‡‡ 0 |
| 36 | 0. 280237168E−05 | C (n) ‡X‡‡ 5 ‡Y‡‡ 1 |
| 37 | 0. 853233272E−07 | C (n) ‡X‡‡ 5 ‡Y‡‡ 2 |
| 38 | −0. 440983515E−08 | C (n) ‡X‡‡ 5 ‡Y‡‡ 3 |
| 39 | −0. 594222184E−05 | C (n) ‡X‡‡ 6 ‡Y‡‡ 0 |
| 40 | −0. 203818180E−07 | C (n) ‡X‡‡ 6 ‡Y‡‡ 1 |
| 41 | −0. 234082501E−08 | C (n) ‡X‡‡ 6 ‡Y‡‡ 2 |
| 42 | 0. 217720204E−06 | C (n) ‡X‡‡ 7 ‡Y‡‡ 0 |
| 43 | −0. 170869598E−09 | C (n) ‡X‡‡ 7 ‡Y‡‡ 1 |
| 44 | −0. 293180184E−08 | C (n) ‡X‡‡ 8 ‡Y‡‡ 1 |

TABLE 3

| Position | (Luminous Energy of Reflection by Reflector) = 1 | (Luminous Energy of Reflection by Light Source) = 1 |
|---|---|---|
| Light source | N/A | 1.000000 |
| Reflector | 1.000000 | 0.791081 |
| Element A (when enter) | 1.000000 | 0.791081 |
| Element A (when exit) | 1.000000 | 0.791081 |
| Element B (when enter) | 0.242126 (*1) | 0.191541 |
| Element B (when exit) | 0.235360 | 0.186189 |
| Element P (when exit) | 0.153828 | 0.121690 |
| Lens (when exit) | 0.153828 | 0.121690 |
| Effective surface of Liquid Crystal Panel | 0.121033 | 0.095747 |
| Within Allowable Angular Range | 0.121033 (*2) | 0.095747 |

(*1) Approximately a ¼ value because this value relates to only a ¼ segment.
(*2) Light utilization efficiency = 0.121033 × 4 = 0.484132

TABLE 4

| Position | Center/maximum | Corner/maximum | Corner/Center |
|---|---|---|---|
| Panel | 0.742395 | 0.623856 | 0.840329 |
| Screen (*3) | 0.973386 | 0.411842 | 0.423102 |

(*3) Evaluated by the value that illuminance distribution of liquid crystal panel multiplied by a(r). Here, a(r) = $1 - (1/2)r^2/\{(AXP/2)^2 + (AYP/2)^2\}$, and r is a distance from the center line, AXP and AYP are the sizes of panel (horizontal and vertical)

What is claimed is:

1. An illumination apparatus for illuminating a light beam onto a target surface, comprising:

a beam shape converter that converts a sectional shape of the light beam into a different shape;

a beam divider that spatially divides the converted light beam into plural light beams; and a beam superimposer that superimposes the plural light beams onto the target surface, wherein the beam divider includes an optical element having a plurality of optical surfaces, and the converted light beam passes through the optical element so that the light beam is spatially divided into the plural light beams, wherein the beam shape converter converts the sectional beam shape in such a manner that boundaries of the optical surfaces of the optical element are more illuminated than center areas of the optical surfaces of the optical element.

2. A projection type image display apparatus for projecting an image onto a screen, comprising:

a light source that emits a light beam, a beam shape converter that converts a sectional shape of the light beam into a different shape;

a beam divider that spatially divides the converted light beam into plural light beams;

a beam superimposer that superimposes the plural light beams onto a target surface;

a processing unit that supplies a signal so as to display an image on the target surface; and a projection lens that projects the image onto the screen by using the superimposed beam, wherein the beam divider includes an optical element having a plurality of optical surfaces, and the converted light beam passes through the optical element so that the light beam is spatially divided into the plural light beams, wherein the beam shape converter converts the sectional beam shape in such a manner that boundaries of the optical surfaces of the optical element are more illuminated than center areas of the optical surfaces of the optical element.

3. An illumination apparatus for illuminating a light beam onto a target surface, comprising:

a beam shape converter that converts a sectional shape of the light beam into a different shape;

a beam divider that spatially divides the converted light beam into plural light beams; and a beam superimposer that superimposes the plural light beams onto the target surface, wherein the shape converter comprises a lens that converts an approximately axially symmetric light beam into the light beam having the different sectional shape.

4. A projection type image display apparatus for projecting an image onto a screen, comprising:

a light source that emits a light beam;

a beam shape converter that converts a sectional shape of the light beam into a different shape;

a beam divider that spatially divides the converted light beam into plural light beams;

a beam superimposer that superimposes the plural light beams onto a target surface;

a processing unit that supplies a signal so as to display an image on the target surface; and a projection lens that projects the image onto the screen by using the superimposed beam, wherein the shape converter comprises a lens that converts an approximately axially symmetric light beam into the light beam having the different sectional shape.

5. A method of illuminating a light beam onto a target surface, comprising steps of:

converting a sectional shape of the light beam into a different shape;

spatially dividing the converted light beam into plural light beams;

superimposing the plural light beams onto the target surface; and converting through a lens an approximately axially symmetric light beam into the light beam having the different sectional shape.

* * * * *